United States Patent [19]
Dreschmann et al.

[11] Patent Number: 5,487,611
[45] Date of Patent: Jan. 30, 1996

[54] SEALING SYSTEM FOR A BEARING

[75] Inventors: Peter Dreschmann, Dittelbrunn; Wilhelm Walter, Oberthulba, both of Germany

[73] Assignee: FAG Kugelfischer Georg Schafer AG, Germany

[21] Appl. No.: 242,434

[22] Filed: May 13, 1994

[30] Foreign Application Priority Data

Jan. 21, 1994 [DE] Germany .............................. 9400995 U

[51] Int. Cl.⁶ .................................................. F16C 33/78
[52] U.S. Cl. .......................... 384/478; 384/482; 384/488
[58] Field of Search ................................... 384/478, 488, 384/482, 477, 140; 277/95

[56] References Cited

U.S. PATENT DOCUMENTS

| | | | |
|---|---|---|---|
| 3,656,824 | 4/1972 | Ullberg | 384/482 |
| 4,383,720 | 5/1983 | Ernst | 384/478 |
| 4,848,776 | 7/1989 | Winckler | 384/478 |
| 5,121,999 | 6/1992 | Johnson et al. | 384/482 |

Primary Examiner—Lenard A. Footland
Attorney, Agent, or Firm—Ostrolenk, Faber, Gerb & Soffen

[57] ABSTRACT

A sealing system for a roller bearing having an inner bearing race on the axle, bearing rollers around the inner race and an outer race around the bearing rollers. A sealing cap is spaced axially away from one axial end of the races. A first sealing ring is sealed to the outer race, and it includes an axial area that extends toward and that is spaced a short distance from the sealing cap defining a first sealing gap. A felt ring is disposed within the bore defined by the axially extending area of the first sealing ring. The felt ring is spaced axially out from the rollers and defines a first grease holding chamber between the rollers and the felt ring and a second grease holding chamber axially outward of the felt ring. A second sealing ring is located axially outward of the felt ring. It includes a sealing lip which seals at the felt ring. The second sealing ring may be mounted to the axle for rotating with the inner race or it may be mounted to the axially extending area of the first sealing ring for rotating with the outer race. A slinger disk is located axially outward of the sealing lip and extends radially outward in the bore within the axial area of the first sealing ring and extends a radial distance for defining a second sealing gap between the axial area of the first sealing ring and the slinger disk.

13 Claims, 2 Drawing Sheets

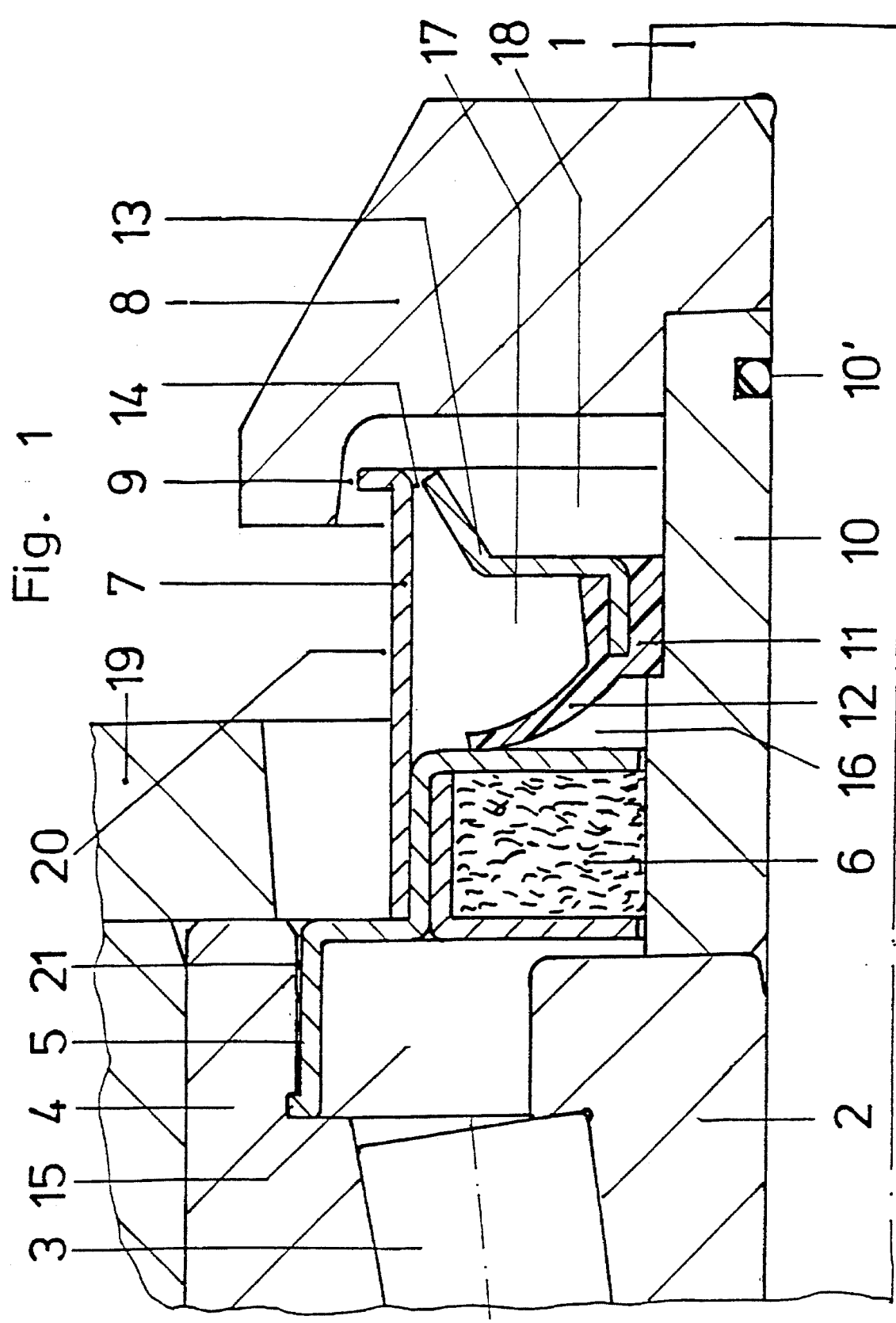

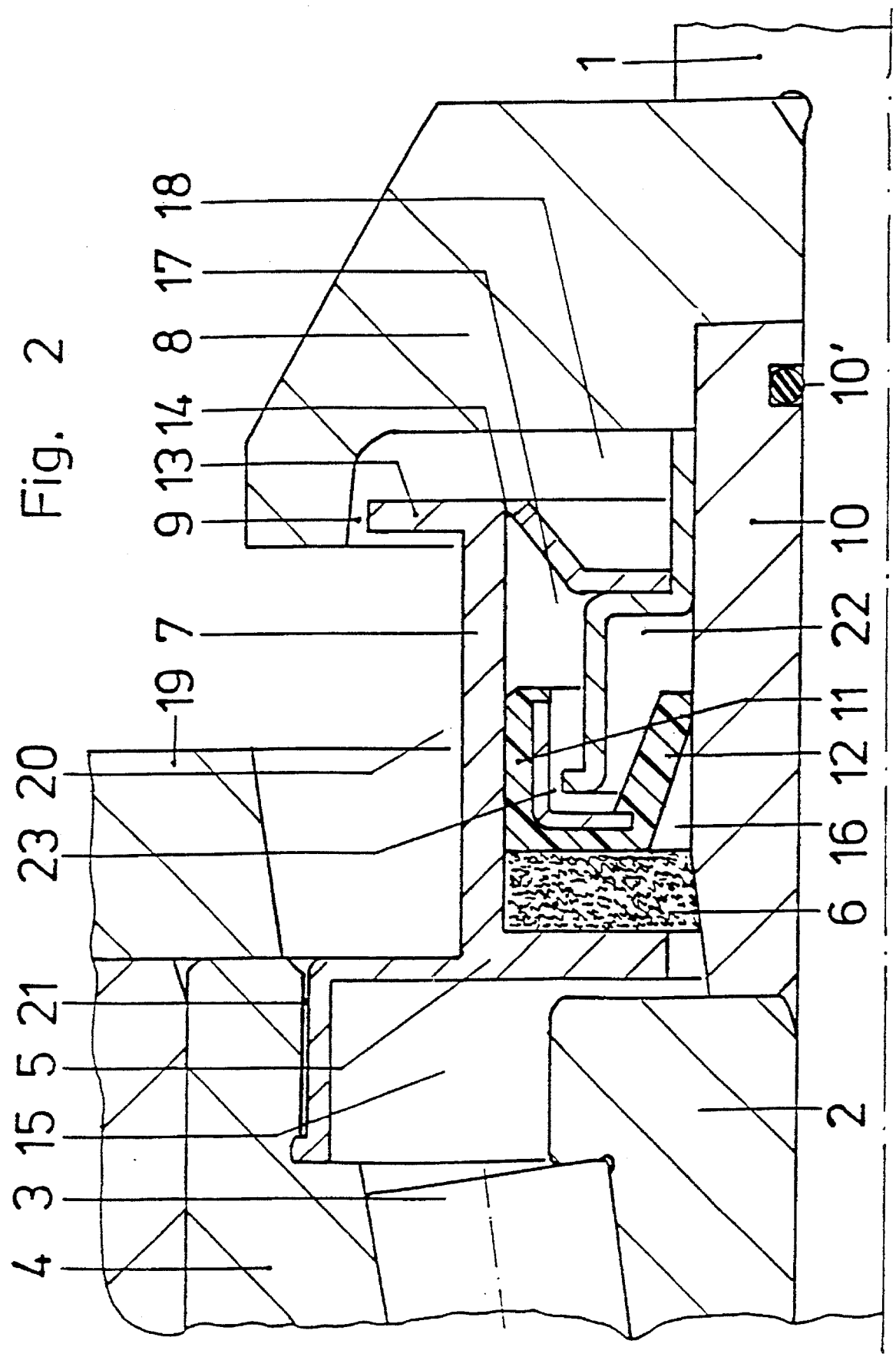

SEALING SYSTEM FOR A BEARING

BACKGROUND OF THE INVENTION

The present invention relates to a sealing system for a roller bearing.

Sealing systems of this kind are used primarily in wheelset bearings, particularly for rail vehicles, to seal against entry of dirt and contaminating water and to avoid formation of water of condensation in the bearing. At high rpm, a low friction sealing system is required that also provides good sealing action even at low rotational speeds and is tight even when at rest, for example when the vehicle is being cleaned in a washer.

A wheelset bearing is known from British Patent 2,016, 095, in which a sealing ring jacketed with rubber is mounted on the outer ring of the bearing. The sealing ring has an axially extending area which makes a transition to a sealing lip. The sealing lip abuts a cap mounted on the axle and forms therewith a chamber open to the outside. A sealing gap is provided inside, with a bushing mounted on the axle. This has a disadvantage that dirt can penetrate the chamber which is open to the outside and damage the sealing lip.

SUMMARY OF THE INVENTION

Therefore the object of the invention is to improve on a sealing system of the type noted above such that a reliable seal of the bearing is produced in all of its operating states, whereby both the escape of grease from the bearing and the penetration of dirt or water into the bearing are avoided. The sealing system should also be of a low friction nature and, in bearings that are sealed on both sides, it should prevent development of overpressure during operation as a result of heating in the bearing, which could turn into a vacuum as a result of cooling when the vehicle is at rest, as the vacuum would suck in damp air, resulting in the formation of water of condensation in the bearing.

The invention concerns a sealing system for a roller bearing having an inner bearing race on the axle, bearing rollers around the inner race and an outer race around the bearing rollers. A sealing cap is spaced axially away from one axial end of the races. A first sealing ring is sealed to the outer race, and it includes an axial area that extends toward and that is spaced a short distance from the sealing cap defining a first sealing gap.

A felt ring is disposed within the bore defined by the axially extending area of the first sealing ring. The felt ring is spaced axially out from the rollers and defines a first grease holding chamber between the rollers and the felt ring and a second grease holding chamber axially outward of the felt ring.

A second sealing ring is located axially outward of the felt ring. It includes a sealing lip which seals at the felt ring. The second sealing ring may be mounted to the axle for rotating with the inner race or it may be mounted to the axially extending area of the first sealing ring for rotating with the outer race.

A slinger disk is located axially outward of the sealing lip and extends radially outward in the bore within the axial area of the first sealing ring and extends a radial distance for defining a second sealing gap between the axial area of the first sealing ring and the slinger disk. The slinger disk is so placed in the axial area so that with reference to the second sealing gap defined by the slinger disk, it defines respective first and second trapping chambers on opposite axial sides of the slinger disk. The second sealing ring may be mounted to the inner race for rotating with it or may be mounted with the outer race. The second sealing disk may be on a bushing on the axle and there may be a seal between the bushing and the axle. The sealing lip from the second sealing ring closes the second grease chamber axially outward of the felt ring.

The formation of a trapping groove and a plurality of trapping chambers acts as a preliminary seal to protect the sealing lip, which is made of an elastomer and is subject to wear, against the influence of dirt and cleaning water that reduce its service life. The trapping grooves and trapping chambers do not undergo any changes during operation, so that their long term function is assured. Entry of water into the trapping chambers is further prevented by a sealing gap and by a rotating slinger.

In applications with a rotating internal ring, the sealing lip, which is subject to wear, experiences a decrease in load with increasing rpm as a result of the influence of centrifugal force. This reduces sealing friction and reduces heating of the sealing points or bearings, as a function of rpm. This increases the service life of the sealing lip and bearing. The same comment applies to an application with a rotating outer ring.

To reinforce the sealing effect, an oil saturated felt ring is provided between the elastomer seal or sealing lip and the bearing. That ring prevents entry of dirt into the bearing and escape of grease from the bearing.

To lubricate the sealing lip, grease is added between the felt ring and the sealing lip, further increasing the service life of the sealing lip. The press fit arrangement of the bushing on the axle prevents twisting (migration) and permits a good heat transfer for the friction heat that develops between the sealing lip and the felt ring, which has a positive influence on their service lives.

At bearing points that are sealed on both sides, overpressure develops in the bearing as a result of heating during operation. This is partially relieved through the elastomer sealing lip. A vacuum then develops in the bearing during rest and cooling. To prevent moist air from being drawn into the bearing, with later formation of water of condensation, the static seats are also sealed off effectively, with the bushing around the axle having an O-ring and the sealing ring being provided with a layer of elastic sealing paint on the outer ring of the bearing. The elastomer sealing lips close like a valve when there is a vacuum in the bearing and at low rpm.

To avoid corrosion with rust penetration in the vicinity of the sealing seat on the outer ring of the bearing, the bore diameter of the axial support element is made conical so that no water can accumulate here via a water pocket. The metal support surfaces for the wiping sealing lip and for the felt ring are made of, or are coated with, non-rusting materials. To avoid damage to the sealing lips caused by freezing of the sealing lip to the contact surface while at rest during cold combined with the pressure of water, and during subsequent starting, provision is made for the running surface and/or the sealing lip to be coated or lined in the contact area with a suitable material, PTFE for example. Using a suitable elastomer that does not freeze onto the running surface is also possible.

Other objects and features of the invention are apparent from the following description of the invention which refers to the accompanying drawings.

BRIEF DESCRIPTION OF THE DRAWINGS

FIG. 1 is a partial cross section through a sealing system according to the invention with a rotating inner ring.

FIG. 2 is a partial cross section through a sealing system according to the invention with a rotating outer ring.

DETAILED DESCRIPTION OF THE INVENTION

In FIG. 1, the axle 1 has a wheelset bearing unit designed as a double row tapered roller bearing. That bearing is comprised of an inner race 2, tapered rollers 3 around the inner race, and an outer race 4 around the rollers. Sealing ring 5 is fastened in the outer race 4. The sealing ring is stepped or staggered narrower, and receives felt ring 6 in its bore axially out beyond the outer race 4. An axial area or sleeve 7 attached to and extending axially out from the ring 5 extends up to a sealing cap 8 and forms a narrow sealing gap 9 with that cap. Sealing cap 8 is mounted with internal bushing 10 on axle 1. The bushing 10 serves as a contact surface for the felt ring 6 and the bushing is sealed off from the axle 1 by an O-ring 10'.

Axially beyond the felt ring 6, there is a sealing ring 11 with a sealing lip 12. The ring 11 is mounted on the bushing 10. The lip 12 on the ring 11 axially abuts the staggered sealing ring 5. A slinger disk 13 is integrated into the sealing ring 11 and extends axially away from the sealing ring 5. The disk 13 is shaped to leave a narrow additional sealing gap 14 together with the axial area 7. Grease chambers 15 and 16 are located on both axial sides of the felt ring 6, one between the races 2 and 4 and at the rollers and one inside the sealing lip 12 at the sealing ring 5.

Slinger disk 13 divides the bore of the axial area 7 into two axially separated trapping chambers 17 and 18, in which any dirt or water that penetrate sequential sealing gaps 9 and 14 are caught outside the seal 12 and are conducted away at the bottom of the bearing.

An axial supporting element 19 for the outer race 4 of the bearing is provided with a conical bore that forms a trapping groove 20 with the axial area and sealing cap 8, in which dirt and water can be captured and conducted away. In order to prevent water from settling in the vicinity of the outer race 4 and causing corrosion, the bore diameter of the axial supporting element 19 is made conical tapering wider axially away from the outer race. The smallest bore diameter is made larger than the seat diameter of the seal 5 in the outer ring 4. To suppress the formation of water of condensation in the bearing, the two static sealing points of the bushing 10 for the axle 1 with an O-ring 10' and of the sealing ring 5 for the outer race 4 with elastic sealing paint 21, are sealed off.

FIG. 2 shows a design similar to FIG. 1. The same parts have been given the same reference numerals. In this design the axial sleeve or area 7 is made integral with the sealing ring 5 while the slinger disk 13 is designed as a part separate from the sealing ring 11. This produces an additional trapping chamber 22 and an additional sealing gap 23.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sealing system for a roller bearing, wherein the roller bearing comprises an axle, an inner bearing race on the axle, bearing rollers around the inner race and an outer bearing race around the bearing rollers;

the inner and outer races having an axial end;

said system comprising a sealing cap axially spaced from the same respective axial end of the inner and outer races;

a first sealing ring sealingly mounted to the outer race, spaced radially out from the inner race; the first sealing ring including an axial area enclosing a bore and extending toward an axial outer end of the first sealing ring that is spaced from the sealing cap a short enough distance as to define a sealing gap between the axially outer end of the axial area of the first sealing ring and the sealing cap;

a felt ring disposed within the bore defined by the axial area of the first sealing ring and located axially out from the end of the inner race; the felt ring being axially spaced away from the bearing rollers as to define a first grease holding chamber axially between the bearing rollers and the felt ring and a second grease holding chamber axially outward of the felt ring;

a second sealing ring located axially outward of the felt ring and including a sealing lip thereon which seals at the felt ring such that the felt ring and the sealing lip may rotate with respect to each other;

the sealing lip from the second sealing ring closing the second grease chamber which is axially outward of the felt ring;

the first sealing ring and the felt ring are mounted to the outer race to rotate with the outer race;

a slinger disk located axially outward of the sealing lip and extending radially outward in the bore within the axial area of the first sealing ring, the slinger disk extending a radial distance as to define a second sealing gap between the axial area of the first sealing ring outward of the slinger disk and the slinger disk;

the slinger disk being so placed in the axial area and with reference to the second sealing gap defined by the slinger disk as to define respective first and second trapping chambers on opposite axial sides of the slinger disk.

2. The sealing system for a roller bearing of claim 1, wherein the second sealing ring is mounted to the axle and the inner race for rotating therewith and with respect to the first sealing ring.

3. The sealing system for a roller bearing of claim 2, wherein the felt ring is mounted to the axle and the inner race for rotating therewith and with respect to the first sealing ring.

4. The sealing system for a roller bearing of claim 2, wherein the slinger disk is mounted to the axle and the inner race for rotating therewith.

5. The sealing system for a roller bearing of claim 4, wherein the axle projects axially out from the inner race, a bushing on the axle and rotating therewith and the first sealing ring; the felt ring and the slinger disk are mounted on the bushing for rotating with the bushing, the axle and the inner race.

6. The sealing system of claim 5, further comprising a seal between the bushing and the axle for sealing off a flow path between them.

7. The sealing system for a roller bearing of claim 2, wherein the first sealing ring is sealed to the outer race.

8. The sealing system for a roller bearing of claim 7, wherein the seal of the first sealing ring to the outer race is by sealing paint.

9. The sealing system for a roller bearing of claim 1, wherein the slinger disk is part of and moves with the second sealing ring.

10. The sealing system for a roller bearing of claim 1, wherein the slinger disk is separate from the second sealing ring.

11. The sealing system for a roller bearing of claim 10, wherein the second sealing ring is mounted to the axial area of the first sealing ring for rotating with the first sealing ring and the outer race with respect to the inner race and for also rotating together with the felt ring.

12. The sealing system for a roller bearing of claim 11, wherein the slinger disk includes a portion thereof extending toward the first sealing ring for defining there a further sealing gap.

13. The sealing system for a roller bearing of claim 12, wherein the sealing lip and the slinger disk are relatively so placed as to provide a space between them which defines an additional trapping chamber.

* * * * *